United States Patent
Panda et al.

(10) Patent No.: US 11,405,459 B2
(45) Date of Patent: Aug. 2, 2022

(54) IMMUTABLE RECORDS BASED GENERATION OF MACHINE LEARNING MODELS FOR DYNAMICALLY TRIGGERING ACTIONS

(71) Applicant: Tata Consultancy Services Limited, Mumbai (IN)

(72) Inventors: Satanik Panda, Kolkata (IN); Abhishek Roy Choudhury, Kolkata (IN); Prateep Misra, Kolkata (IN); Tanushyam Chattopadhyay, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 551 days.

(21) Appl. No.: 16/542,339

(22) Filed: Aug. 16, 2019

(65) Prior Publication Data

US 2020/0285991 A1    Sep. 10, 2020

(30) Foreign Application Priority Data

Mar. 8, 2019 (IN) .............................. 201921009120

(51) Int. Cl.
| | | |
|---|---|---|
| G06F 21/62 | (2013.01) | |
| H04L 67/12 | (2022.01) | |
| G06N 20/00 | (2019.01) | |
| H04L 9/06 | (2006.01) | |
| G16Y 40/20 | (2020.01) | |
| H04L 9/00 | (2022.01) | |

(52) U.S. Cl.
CPC .......... *H04L 67/12* (2013.01); *G06F 21/6254* (2013.01); *G06N 20/00* (2019.01); *H04L 9/0637* (2013.01); *G16Y 40/20* (2020.01); *H04L 9/50* (2022.05)

(58) Field of Classification Search
CPC ... H04L 67/12; H04L 9/0637; H04L 2209/38; H04L 63/12; G06F 21/6254; G06N 20/00; G16Y 40/20
See application file for complete search history.

(56) References Cited

U.S. PATENT DOCUMENTS

| | | | |
|---|---|---|---|
| 9,881,176 | B2 | 1/2018 | Goldfarb et al. |
| 9,990,504 | B1 | 6/2018 | Champman et al. |
| 10,135,607 | B1 | 11/2018 | Roets |
| 2016/0306982 | A1 | 10/2016 | Seger, II et al. |

(Continued)

*Primary Examiner* — Kim T Nguyen
(74) *Attorney, Agent, or Firm* — Finnegan, Henderson, Farabow, Garrett & Dunner LLP

(57) ABSTRACT

Machine Learning (ML) models are deployed in digital platforms for data analytics. However, it is realized that there is growing trends of recognition that machine learning models expose new vulnerabilities in software systems, for instance training data poisoning, adversarial responses, model extraction, and the like. Embodiments of the present disclosure provide systems and methods for safeguarding training dataset by exploiting immutability feature and generating immutable machine learning models for data analytics. More specifically, immutable records of events are governed by smart contracts within highly secure permissioned distributed ledger. This dataset is used for training multiple machine learning models which are immutable in nature and further utilized for triggering actions for incoming request(s) from IoT platforms.

12 Claims, 3 Drawing Sheets

(56) References Cited

U.S. PATENT DOCUMENTS

| | | |
|---|---|---|
| 2017/0287090 A1 | 10/2017 | Hunn et al. |
| 2018/0129955 A1 | 5/2018 | Saxena et al. |
| 2019/0287026 A1* | 9/2019 | Calmon ................ G06N 20/00 |
| 2020/0143267 A1* | 5/2020 | Gidney ................. G06N 3/006 |

\* cited by examiner

IMMUTABLE RECORDS BASED GENERATION OF MACHINE LEARNING MODELS FOR DYNAMICALLY TRIGGERING ACTIONS

PRIORITY CLAIM

This U.S. patent application claims priority under 35 U.S.C. § 119 to Indian Application No. 201921009120, filed on Mar. 8, 2019. The entire contents of the aforementioned application are incorporated herein by reference.

TECHNICAL FIELD

The disclosure herein generally relates to machine learning models generation for analytics, and, more particularly, to immutable machine learning models generation for analytics.

BACKGROUND

With an advent of technologies, there is increase in demand for data for analytics. Machine Learning (ML) models are deployed for such data analytics. However, it is realized that there is growing trends of recognition that machine learning models expose new vulnerabilities in software systems. For example, few of current challenges that remain unresolved as dominating threat vectors include training data poisoning, adversarial responses, model extraction, and the like. The exposure of the vulnerabilities are restricted or limited from the above threat vectors. This may be due to large attack surface exposed by ML algorithms because they were designed for deployment in benign environments (e.g., a non-hostile location protected from external hostile elements by physical, personnel, and procedural security countermeasures) as exemplified by the IID (in probability theory and statistics, a sequence or collection of random variables is independent and identically distributed (i.i.d. or iid or IID) if each random variable has the same probability distribution as the others and all are mutually independent) assumption for training and test data. Second reason being limited availability of theoretical tools to analyze generalization and lack of reliable confidence estimates.

Moreover, ML models require data from IoT sources for training different models to derive actionable insight from the data wherein sanctity check needs to performed on the data prior to performing any analytics. However, in reality, data captured from the sensors may not be normalized if the sensor is having noise or the operating condition is beyond the normal operating limits. Existing systems and methods do not have such capabilities to removal noise and as such traceability of the actual data from the source till usage, as the training data set is not captured or derived across the complete process flow. Further, any modification in training dataset for the machine learning model may not guarantee that the end result is achieved without any error thus leading to inaccurate analytics.

SUMMARY

Embodiments of the present disclosure present technological improvements as solutions to one or more of the above-mentioned technical problems recognized by the inventors in conventional systems. For example, in one embodiment, a processor implemented method for generating immutable machine learning models for data analytics is provided. The method comprises receiving, via one or more hardware processors, an input source data corresponding to at least one trusted data source amongst a plurality of trusted data sources; storing the input source data in a multiple validator node distributed ledger to obtain a plurality of immutable records, wherein the multiple validator node distributed ledger is created for storing the input source data based on at least one of a consensus algorithm and a smart contract between the plurality of trusted data sources; generating one or more machine learning models using the plurality of immutable records retrieved from the multiple validator node distributed ledger; storing the one or more machine learning models as one or more immutable machine learning models in the multiple validator node distributed ledger, wherein the one or more immutable machine learning models are generated based on the plurality of immutable records for one or more passive supervised machine learning techniques; and dynamically triggering, one or more actions specific to at least one Internet of Things (IoT) device deployed in an IoT platform using the one or more immutable machine learning models based on an input request received corresponding to the at least one Internet of Things (IoT) device.

In an embodiment, the input request is received based on a trigger induced by at least one of a rule being executed or an event occurred in the IoT platform.

In an embodiment, the one or more actions comprise activation or deactivation of one or more functionalities of the at least one IoT device based on at least one of a rule being executed or an event occurred in the IoT platform.

In an embodiment, the method may further comprise receiving a request from one or more trusted data sources; anonymizing the plurality of immutable records to obtain a set of anonymization data; and dynamically retrieving from the multiple validator node distributed ledger and providing, at least one of (i) at least a subset of the set of anonymization data, and the one or more immutable machine learning models to the one or more trusted data sources, based on the request.

In another aspect, a system for generating immutable machine learning models for data analytics is provided. The system comprises a memory storing instructions; one or more communication interfaces; and one or more hardware processors coupled to the memory via the one or more communication interfaces, wherein the one or more hardware processors are configured by the instructions to: receive an input source data corresponding to at least one trusted data source amongst a plurality of trusted data sources; store the input source data in a multiple validator node distributed ledger to obtain a plurality of immutable records, wherein the multiple validator node distributed ledger is created for storing the input source data based on at least one of a consensus algorithm and a smart contract between the plurality of trusted data sources; generate one or more machine learning models using the plurality of immutable records retrieved from the multiple validator node distributed ledger; storing the one or more machine learning models as one or more immutable machine learning models in the multiple validator node distributed ledger, wherein the one or more immutable machine learning models are generated based on the plurality of immutable records for one or more passive supervised machine learning techniques; and dynamically trigger, one or more actions specific to at least one Internet of Things (IoT) device deployed in an IoT platform using the one or more immutable machine learning models based on an input request received corresponding to the at least one Internet of Things (IoT) device.

In an embodiment, the input request is received based on a trigger induced by at least one of a rule being executed or an event occurred in the IoT platform.

In an embodiment, the one or more actions comprise activation or deactivation of one or more functionalities of the at least one IoT device based on at least one of a rule being executed or an event occurred in the IoT platform.

In an embodiment, the one or more hardware processors are further configured by the instructions to: receiving a request from one or more trusted data sources; anonymizing the plurality of immutable records to obtain a set of anonymization data; and dynamically retrieving from the multiple validator node distributed ledger and providing, at least one of (i) at least a subset of the set of anonymization data, and the one or more immutable machine learning models to the one or more trusted data sources, based on the request.

In yet another aspect, there are provided one or more non-transitory machine readable information storage mediums comprising one or more instructions which when executed by one or more hardware processors cause generating immutable machine learning models for data analytics by receiving, via the one or more hardware processors, an input source data corresponding to at least one trusted data source amongst a plurality of trusted data sources; storing the input source data in a multiple validator node distributed ledger to obtain a plurality of immutable records, wherein the multiple validator node distributed ledger is created for storing the input source data based on at least one of a consensus algorithm and a smart contract between the plurality of trusted data sources; generating one or more machine learning models using the plurality of immutable records retrieved from the multiple validator node distributed ledger; storing the one or more machine learning models as one or more immutable machine learning models in the multiple validator node distributed ledger, wherein the one or more immutable machine learning models are generated based on the plurality of immutable records for one or more passive supervised machine learning techniques; and dynamically triggering, one or more actions specific to at least one Internet of Things (IoT) device deployed in an IoT platform using the one or more immutable machine learning models based on an input request received corresponding to the at least one Internet of Things (IoT) device.

In an embodiment, the input request is received based on a trigger induced by at least one of a rule being executed or an event occurred in the IoT platform.

In an embodiment, the one or more actions comprise activation or deactivation of one or more functionalities of the at least one IoT device based on at least one of a rule being executed or an event occurred in the IoT platform.

In an embodiment, the instructions which when executed by the one or more hardware processors further cause receiving a request from one or more trusted data sources; anonymizing the plurality of immutable records to obtain a set of anonymization data; and dynamically retrieving from the multiple validator node distributed ledger and providing, at least one of (i) at least a subset of the set of anonymization data, and the one or more immutable machine learning models to the one or more trusted data sources, based on the request.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
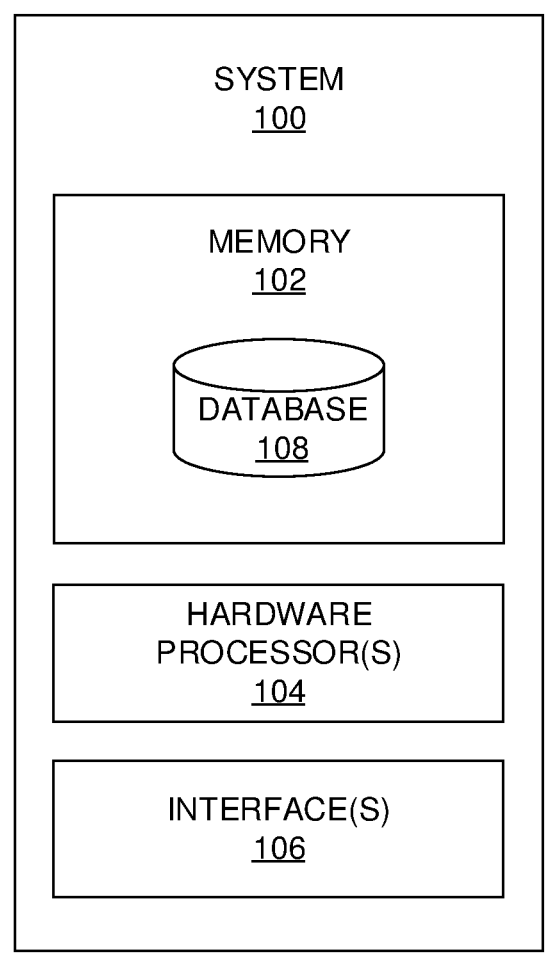
FIG. 1 illustrates an exemplary block diagram of a system for generating immutable machine learning models for data analytics, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As discussed above, Machine Learning (ML) models require data from IoT sources for training different models to derive actionable insight from the data wherein sanctity check needs to performed on the data prior to performing any analytics. However, in reality, data captured from sensors may not be normalized if the sensor is having noise or the operating condition is beyond the normal operating limits. Existing systems and methods may fail to demonstrate such capabilities to removal noise and as such traceability of actual data from the source till usage of training data set is not getting captured or derived across the complete process flow. Such incomplete process flow and analytics are prone to errors, leading to inaccurate results. Embodiments of the provide systems and methods for storing records in a multiple validator nodes based distributed ledger thus making the records immutable. Based on these immutable records, the present disclosure further generates machine learning models which are stored as immutable ML models in the multiple validator nodes based distributed ledger, thus making the ML models tamper proof and secured from exposing critical privacy data. The immutable machine learning models and training dataset thereof created during the process and ML generation, are further used for triggering (dynamic) actions based on input request received from IoT platform(s). Such input request for instance, may comprise actuation of an IoT device based on rule(s) or event(s) occurred in the IoT platform which comprises IoT connected devices, gateways, and the like communicating amongst each other. Rule(s) for example, may comprise forcing the IoT platform to perform one or more actions (e.g., enabling or disabling a particular function/activity) specific to operations of IoT devices deployed in the IoT platform. Event(s) occurring in the IoT platform may include, anomaly detection, usual pattern of execution of activities, and the like, wherein the event may indicate representative data that is below or above pre-defined threshold thus causing abnormalities in the IoT platform and deployed IoT devices thereof. Upon receiving such request, the (trained) immutable ML models are configured to act on the received request and accordingly trigger or dynamically trigger actions. For instance, in case of anomaly observed in say sensor data received from an IoT device (e.g., say IoT device 1) deployed in IoT platform, the trained immutable ML model(s) or specific immutable ML model may take necessary action for example, deactivate the IoT device 1 or disconnect the communication interface(s) of the IoT device 1 (e.g., for which request is being received) from the IoT platform, thereby disabling the functionalities of the IoT device 1. The deactivation and/or disabling the functionalities may be performed until the IoT device 1 is fully functional or until the issue notices is resolved/fixed and then deployed back in the IoT platform. The expression 'IoT' and 'IOT' refer to Internet of Things and may be interchangeably used herein. Moreover, training dataset may be outputted based on the rules execution, events being occurring, and actions taken by the ML models for further training the ML models and storing them as updated immutable ML models based on smart contract(s) between stakeholders. The updated immutable ML models can further be used for further analytics as in the above mentioned example (e.g., refer to deactivation and/or disabling the functionalities). In another scenario, request may include information on IoT device (e.g., IoT device 2) being disabled, and because of which there may be an anomaly observed in the IoT platform. Such request may be attended by the immutable ML model (or the update immutable ML model) by activating the IoT device 2 and enabling the functionalities of the IoT device 2 thereof.

Figure 2:
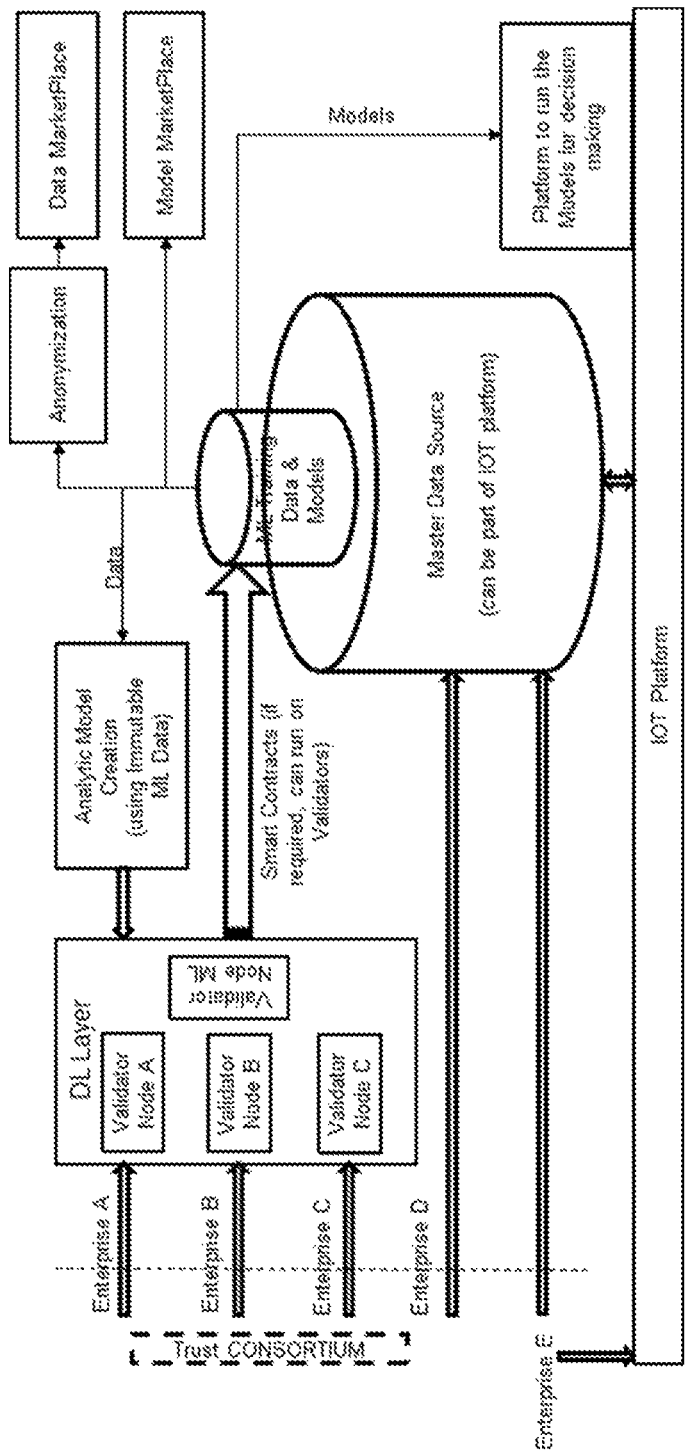
FIG. 2 illustrates an exemplary block diagram of the system for generating immutable machine learning models for data analytics, in accordance with an embodiment of the present disclosure.
Figure 3:
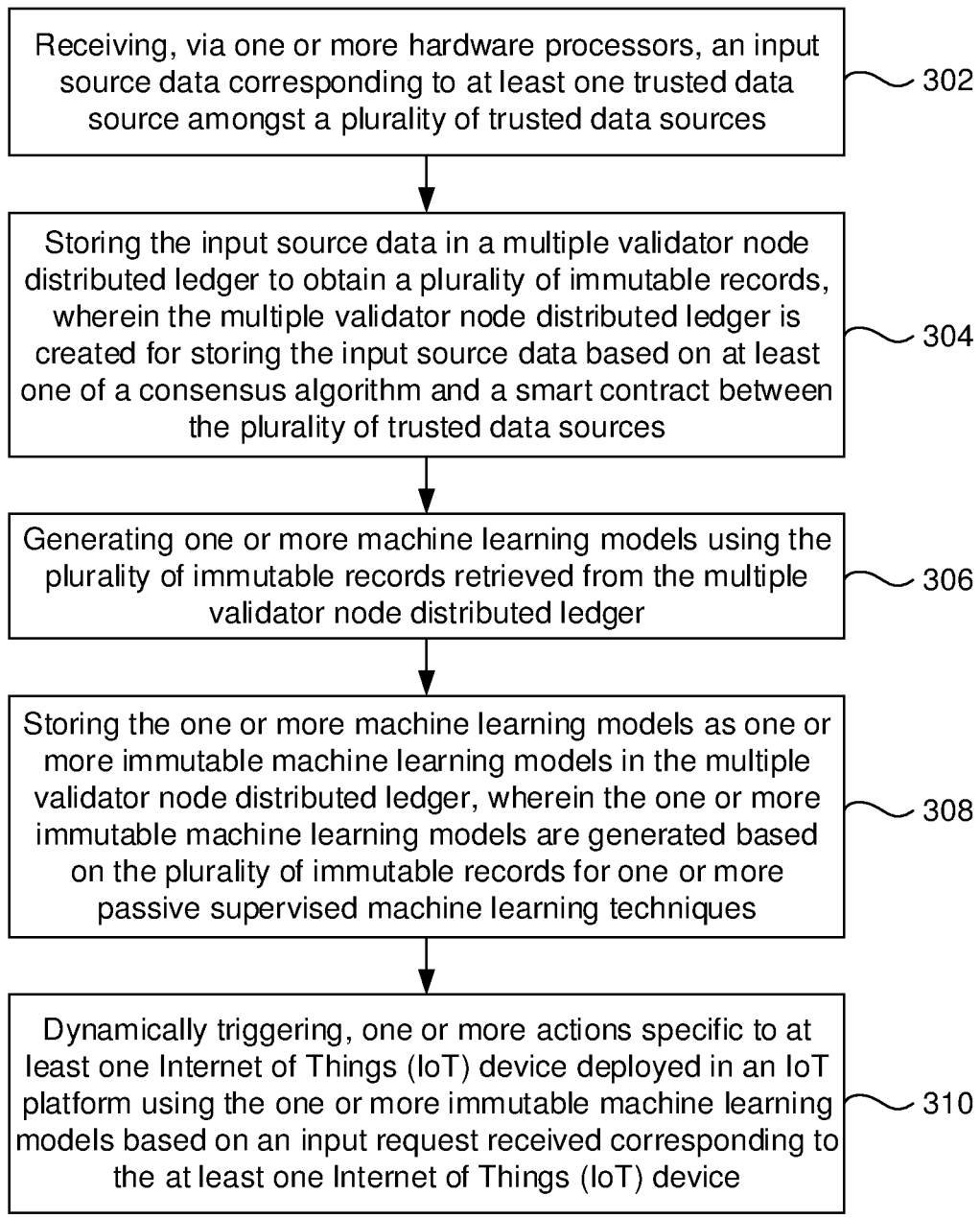
FIG. 3 illustrates an exemplary flow diagram of a method for generating immutable machine learning models for data analytics using the system of FIG. 1 in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for generating immutable machine learning models for data analytics, in accordance with an embodiment of the present disclosure. The system 100 may also be referred as 'an immutable analytics system' or 'a data analytics system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise information, for example, (business) requirements captured from one or more sources (e.g., trusted data sources, entities, and the like), consortia of trusted data sources, input source data pertaining to trusted data sources, and the like. In an embodiment, the memory 102 may store (or stores) one or more model(s) (e.g., machine learning models for example, Remaining Useful Life, Recurrent Neural Network (RNN), Recommendation engine, and the like) that are generated using immutable records generated based on the generated data. The database 108 may also act as a multiple validator node based distributed ledger that further stores training dataset derived from original dataset (e.g., in this case input source data). The training dataset may be used for generating immutable machine learning model(s) or immutable training models which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to any event occurring in an Internet of Things (IoT) platform may be stored in the memory 102. The IoT platform comprises IoT devices deployed, wherein data from IoT devices are collected for data analytics and for decision making during execution of rules (e.g., say pre-defined rules), and/or event(s) occurring during actuation of IoT devices.

FIG. 2, with reference to FIG. 1, illustrates an exemplary block diagram of the system 100 for generating immutable machine learning models for data analytics, in accordance with an embodiment of the present disclosure, in accordance with an embodiment of the present disclosure. Alternatively, FIG. 2, illustrates an exemplary implementation of the system 100 for generating immutable machine learning models for data analytics, in accordance with an embodiment of the present disclosure. The architecture as depicted in FIG. 2 is configured to store input source data corresponding to trusted data source(s) in a multiple validator nodes based distributed ledger (e.g., also referred as 'multiple validator node distributed ledger').

FIG. 3, with reference to FIGS. 1-2, illustrates an exemplary flow diagram of a method for generating immutable machine learning models for data analytics using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, block diagram of FIG. 2 and the flow diagram as depicted in FIG. 3. In an embodiment of the present disclosure, at step 302, the one or more hardware processors 104 receiving, via one or more hardware processors, an input source data corresponding to at least one trusted data source amongst a plurality of trusted data sources. Prior to receiving the input source data, an input specific to a requirement (e.g., say business requirement) is received. Using the input requirement, a consortia of a plurality of trusted data sources is created to refrain from posing training data (or training dataset). Assuming, the plurality of trusted data sources comprise, say 4 Enterprises (engine manufacturer, airframe manufacturer, airlines, Software Service Provider) and these trusted data sources are creating a business together for offering end to end service to the customers. So, a consortium is created between the 4 enterprises (e.g., Enterprise A, Enterprise B, Enterprise C, and Enterprise D as depicted in FIG. 2) and a validator is included at each enterprise as depicted in FIG. 2, for creation of the distributed ledger (thus making it 'multiple validator node distributed ledger').

Referring to steps, at step 304, in an embodiment of the present disclosure, the one or more hardware processors 104 store the input source data in the multiple validator node distributed ledger to obtain a plurality of immutable records. In an embodiment, expressions 'immutable records' and 'immutable training dataset' or 'training dataset' are/may be interchangeably used hereinafter'. As mentioned above, the multiple validator node distributed ledger is created for storing the input source data based on at least one of a consensus algorithm and a smart contract between the trusted data sources.

Let ABC airlines (e.g., Enterprise E as depicted in FIG. 2) start collecting all the data from a plane engine and also from a plain airframe. Let Software Service Provider be given the responsibility to offer a predictive model for each critical components of the plane based on whose output both an Original Equipment Manufacturer (e.g., say OEM XYZ) provides Service Level Agreement (SLA). In this process, Software Service Provider uses its IoT platform to capture end sensor data for processing it further for analysis. As soon as the data starts flowing to all validator nodes they are checked if the data can be shared. In other words, data validation is performed to determine whether data is coming for desired source based on rules of the contracts between the plurality of trusted data sources. Once the data is committed to the distributed ledger then it is known to all 4 enterprises as described in step 304. In an embodiment of the present disclosure, each transaction payload (or sensor data) may have the following format:

Transaction_key of 8 character each:
Total transaction string: ABCDEFGHIJ:
ABC: has possibly 2 values: IOT or NAN
DE: determines the input data format: EV (Event) ST (Stream), OB (Observation),
GE (Geofence), and the like
FGH: determines service type which is the source of the request > AST, DM,
SOS, NBK, TDE, TSK etc
I: determines if it is IoT based transaction
J: determines if the transaction is on the cloud or Edge At step 306, in an embodiment of the present disclosure, the one or more hardware processors 104 generate one or more machine learning models using the plurality of immutable records retrieved from the multiple validator node distributed ledger. In this case, the immutable records herein may be referred to end sensor data captured from plane engine, plane airframe, and the like.

At step 308, in an embodiment of the present disclosure, the one or more hardware processors 104 store the one or more machine learning models as one or more immutable machine learning models in the multiple validator node distributed ledger as depicted in FIG. 2. In an embodiment, the one or more immutable machine learning models are generated based on the plurality of immutable records for one or more passive supervised machine learning techniques. In an embodiment, the one or more passive supervised machine learning technique(s), may comprise but are not limited to, Random Forest (RF) regression, RF classifier, Support Vector (SV) classifier, SV Regression, and the like. The above ML techniques may be generated using the immutable training dataset. Therefore, for any ML technique, input dataset may be the only matter of consideration.

At step 310, in an embodiment of the present disclosure, the one or more hardware processors 104 dynamically trigger, one or more actions specific to at least one Internet of Things (IoT) device deployed in the IoT platform using the one or more immutable machine learning models based on an input request received corresponding to the at least one Internet of Things (IoT) device. For instance, the input request may be received based on a trigger induced by at least one of a rule being executed or an event occurred in the IoT platform. In an embodiment, dynamically triggering the one or more actions comprise activation or deactivation of one or more functionalities of the at least one IoT device based on the rule being executed and/or the event occurred in the IoT platform. For instance, a rule execution may refer to enabling a specific functionality of the IoT device. In another instance, an event occurred in the IoT platform may be referred as an anomaly pattern due to which an activation or deactivation of the IoT device may be required. In an embodiment, actuation of the IoT device may be referred as performing one of an activation or deactivation of one or more functionalities of the IoT device for which request is received. In an embodiment, actuation can also take place on targets (e.g., IoT devices, other database, softwares, mobile end points such as applications executed on mobile devices) based on IoT transaction that gets validated using smart contract both on cloud and also on edge. Based on the transaction occurrence either on Cloud or on edge, actuation of the target (e.g., IoT device) can be achieved by embodiments of the present disclosure and systems and methods associated thereof. For instance, each transaction payload may have following format expressed by way of example and shall not be construed as limiting the scope of the present disclosure:

Assuming Transaction key 8 character each:
Total transaction string: ABCDEFGHIJ:
ABC: to have possible 2 values>IOT or NAN (also referred as Non IoT data)
DE: determines the input data format>EV (Event), ST (Stream), OB
(Observation), GE (Geofence) and the like
FGH: determines service type which is the source of the request>AST
(AssetService), DM (Device Management), SOS (Sensor Observation Service),
NBK (Notebook Service), TDE (Data Explorer), TSK (Task Service), etc.
I: Determines if it is an IoT based transaction
J: Determines if the transaction is on the cloud or Edge By this approach reference block can be recovered for a specific domain based immutable transaction log associated with any specific IOT services.

Further, the immutable records and the immutable machine learning models generated and stored in the multiple validator node distributed ledger may be used for creation of data marketplace. For instance, a request from one or more trusted data sources may be received. Based on the request, the plurality of immutable records are masked (or anonymized) to obtain a set of anonymization data. The step of masking (or anonymization) may either be performed in real-time, near real-time or offline depending upon the request and its type thereof. Based on the request, at least one of (i) at least a subset of the set of anonymization data, and (ii) the one or more immutable machine learning models are dynamically retrieved from the multiple validator node distributed ledger and provided to the one or more trusted data sources. In an embodiment, step of masking (or anonymization) is performed on the immutable records to ensure that privacy data (e.g., customer data such as name of person, entity, user identifier, bank details, account number, and the like) is not exposed to any third party. By masking or anonymizing the immutable records, the immutable records are now ensured that the records are not only tamper proof but also the real data underneath is not exposed to any third party or end user/stakeholder. The stakeholder who is in receipt of the anonymized data has to then unmask (or decrypt) to use the underneath immutable records for model generation for further analytics.

Embodiments of the present disclosure enable implementation and execution of the system and modeling thereof, in various infrastructures. After the modeling is done then the components and validators associated with the distributed ledger are generated as per metadata and are deployed to the specific target infrastructure (examples of target infrastructure may comprise 3 layer infrastructure). For example, if a Machine is taken as an Asset and it has 2 Sensors, for instance speed, vibration. Data associated with speed and vibration can be referred as metadata, wherein actual data includes values like 30 rpm representing motor speed, and 40 hertz representing vibration. The distributed ledger then acts as an immutable distributed ledger for training data set which can be used for machine learning.

The system of the present disclosure supports On-Prem (or On-premises), Cloud, Hybrid and Edge deployment topologies. For instance, validator nodes are loosely coupled, and they are required to communicate amongst each other. These nodes are deployed in the enterprises for analytical model execution which is required to work with these validator nodes to taken immutable data and immutable ML models from the validator nodes and execute in the target execution environment. Further, the present disclosure supports Intra-Enterprise and Inter-Enterprise deployment. In Inter-Enterprise deployment, all enterprises may or may not provision its IOT platform. As the present disclosure supports multiple validators which are to be deployed in different enterprises, all of these validator run behind the gateway where the external interfaces communicate communicating. This ensures that whole network is aware when a gateway interface communicates with another gateway interface or across gateway interfaces.

The present disclosure is therefore highly secured due to implementation of secure enclaves at validator nodes based on TEE (Trusted Execution Environment) principle. For instance, distributed Ledger product selected could have features such as Intel SGX (software guard extensions) where the key exchanges/transaction would be very secure.

Moreover, the present disclosure and its systems and methods are configured with APIs for enabling post blocks to Block chain (also referred as 'distributed ledger' as described by the present disclosure) domain and data specific and viewing history with selection criterion based on IoT and non IoT based parties mutual agreement. Example of APIs may include as mentioned below:

The service is going to submit the blocks in the distributed ledge:

URL: http://10.100.11.2:9100/api/IoTPlaformSubmit

HTTP Method: POST

Example: http://10.100.11.2:9100/api/IoTPlaformSubmit

Request Headers: Following request headers need to be passed:

| Header Name | Value | Mandatory | When |
|---|---|---|---|
| x-api-key | Valid api key of the tenant | Y | In every API call |
| Content-Type | "application/json" | Y | In every API call |

Request Data:
```
{
    "version": "1.0.1",
    "observations": [{
        "id": 98881506,
        "sensor": "FleetTracking.55555.867857039225177_Sensor",
        "feature": "55555",
        "userId": "55555_user",
        "record": [{
            "starttime": "12-AUG-2018 05:14:38 UTC",
            "output": [{
                "name": "time",
                "value": "051526",
                "type": "text"
            },
            {
                "name": "CSMessageReceivedTime",
                "value": "2018-08-12T05:14:38",
                "type": "text"
            },
            {
                "name": "imei",
                "value": "867857039225177",
                "type": "text"
            }
            ],
            "position-global": {
                "latitude": "40.291122",
                "longitude": "-74.473686"
            }
        }]
    }]
}
```

HTTP Response:

| Status Codes | Reason |
|---|---|
| 200 | Operation succeeded |
| 401 | x-api-key header value is invalid |
| 500 | In case of error |

Response Data:

"The data submitted successfully."

Example of enabling post distributed ledger domain and data specific and viewing history with selection criterion based on IoT and non IoT based parties mutual agreement is given below and shall not be construed as limiting the scope of present disclosure:

The service is going to return the details of the last blocks from the distributed ledger mentioned in the URL URL: http://10.100.11.2:9100/api/blocks/<Block Count Number>

HTTP Method: GET

Example: http://10.100.11.2:9100/api/blocks/2

Request Headers: Following request headers need to be passed:

| Header Name | Value | Mandatory | When |
|---|---|---|---|
| x-api-key | Valid api key of the tenant | Y | In every API call |
| Content-Type | "application/json" | Y | In every API call |

HTTP Response:

| Status Codes | Reason |
|---|---|
| 200 | Operation succeeded |
| 401 | x-api-key header value is invalid |
| 500 | In case of error |

Response Data:

```
["USER_ID:55555_user|TENANT_ID:55555|ASSET_ID:867857039225177|
PAYLOAD_IDENTIFIER:IoTPlaformSOS|PAYLOAD:[{\"id\":98881506,\
"sensor\":\"FleetTracking.55555.867857039225177_Sensor\",\"feature\":\
"55555\",\"userId\":\"55555_user\",\"record\":[{\"starttime\":\"12-AUG-2018
05:14:38 UTC\",\"output\":[{\"name\":\"time\",\"value\":\"051526\",\"type\":
\"text\"},{\"name\":\"CSMessageReceivedTime\",\"value\":\"2018-08-12T05:14:38\",
\"type\":\"text\"},{\"name\":\"imei\",\"value\":\"867857039225177\",\"type\":
\"text\"}],\"position-global\":{\"latitude\":\"80.291122\",\"longitude\":
\"-84.473686\"}}]}]|REMARKS:undefined|HOST_NAME:192.168.161.175:9100|
TRANSACTION_DATE:Mon, 27 Aug 2018 10:09:40 GMT",
"USER_ID:55555_user|TENANT_ID:55555|ASSET_ID:867857039225177|
PAYLOAD_IDENTIFIER:
IoTPlaformSOS|PAYLOAD:[{\"id\":98881506,\"sensor\":
\"FleetTracking.55555.867857039225177_Sensor\",\"feature\":
\"55555\",\"userId\":\"55555_user\",\"record\":[{\"starttime\":\"12-AUG-2018 05:14:38
UTC\",\"output\":[{\"name\":\"time\",\"value\":\"051526\",\"type\":\"text\"},{\"name\":
\"CSMessageReceivedTime\",\"value\":\"2018-08-12T05:14:38\",
\"type\":\"text\"},{\"name\":\"imei\",\"value\":\"867857039225177\",\"type\":
\"text\"}],\"position-global\":{\"latitude\":\"40.291122\",\"longitude\":
\"-74.473686\"}}]}]|REMARKS:undefined|HOST_NAME:192.168.161.175:9100|
TRANSACTION_DATE:Mon, 27 Aug 2018 10:04:12 GMT"]
```

Embodiments of the present disclosure, systems and methods associated thereof may be implemented for various applications mentioned below and these examples shall not be construed as limiting the scope of the present disclosure:

1. NodeJS for YAML (e.g., human-readable data serialization language) generation
2. Volume mounting/DB for making distributed ledge persistent and Proxy setup for whitelisting clients (config file) part of YAML file
3. New generic distributed ledger transaction generation (Identifier, Payload size, Payload)—YAML file generated using the NodeJS
4. API (restful APIs) for the New generic distributed ledger (or blockchain) transaction
5. Client SDKs (Java & Python/NodeJS) for the New generic Blockchain transaction (Clients and non-IoT platform validators to use this)
6. IoT platform Cloud: RabbitMQ (bind)t; Action rules; Local BaaS Validator API (may not be required, may use HTTP endpoints), Baas also referred as Mobile backend as a service
7. For Edge: Mosquito (queue); Edgent (rule); Local BaaS Validator API
8. API to selectively query from any Validator and SDKs
9. Proxy Gateway configuration (e.g., port number configuration) system 100 provides additional security as a layer by the present disclosure
10. Swagger for trying of the BaaS (Swagger is restful API view framework)

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, an input source data corresponding to at least one trusted data source amongst a plurality of trusted data sources;
storing the input source data in a multiple validator node distributed ledger to obtain a plurality of immutable records, wherein the multiple validator node distributed ledger is created for storing the input source data based on at least one of a consensus algorithm and a smart contract between the plurality of trusted data sources;
generating one or more machine learning models using the plurality of immutable records retrieved from the multiple validator node distributed ledger;
storing the one or more machine learning models as one or more immutable machine learning models in the multiple validator node distributed ledger, wherein the one or more immutable machine learning models are generated based on the plurality of immutable records for one or more passive supervised machine learning techniques; and
dynamically triggering, one or more actions specific to at least one Internet of Things (IoT) device deployed in an IoT platform using the one or more immutable machine learning models based on an input request received corresponding to the at least one Internet of Things (IoT) device.

2. The processor implemented method of claim 1, wherein the input request is received based on a triggered induced by at least one of a rule being executed or an event occurred in the IoT platform.

3. The processor implemented method of claim 1, wherein the one or more actions comprise activation or deactivation of one or more functionalities of the at least one IoT device based on at least one of a rule being executed or an event occurred in the IoT platform.

4. The processor implemented method of claim 1, further comprising:
receiving a request from one or more trusted data sources;
anonymizing the plurality of immutable records to obtain a set of anonymization data; and
dynamically retrieving from the multiple validator node distributed ledger and providing, at least one of (i) at least a subset of the set of anonymization data, and (ii) the one or more immutable machine learning models to the one or more trusted data sources, based on the request.

5. A system comprising:
a memory storing instructions;
one or more communication interfaces; and
one or more hardware processors coupled to the memory via the one or more communication interfaces, wherein the one or more hardware processors are configured by the instructions to:
receive an input source data corresponding to at least one trusted data source amongst a plurality of trusted data sources;
store the input source data in a multiple validator node distributed ledger to obtain a plurality of immutable records, wherein the multiple validator node distributed ledger is created for storing the input source data based on at least one of a consensus algorithm and a smart contract between the plurality of trusted data sources;
generate one or more machine learning models using the plurality of immutable records retrieved from the multiple validator node distributed ledger;
store the one or more machine learning models as the one or more immutable machine learning models in the multiple validator node distributed ledger, wherein the one or more immutable machine learning models are generated based on the plurality of immutable records for one or more passive supervised machine learning techniques; and
dynamically trigger, one or more actions specific to at least one Internet of Things (IoT) device deployed in an IoT platform using the one or more immutable machine learning models based on an input request received corresponding to the at least one Internet of Things (IoT) device.

6. The system of claim 5, wherein the input request is received based on a triggered induced by at least one of a rule being executed or an event occurred in the IoT platform.

7. The system of claim 5, wherein the one or more actions comprise activation or deactivation of one or more functionalities of the at least one IoT device based on at least one of a rule being executed or an event occurred in the IoT platform.

8. The system of claim 5, wherein the one or more hardware processors are further configured by the instructions to:
receive a request from one or more trusted data sources;
anonymize the plurality of immutable records to obtain a set of anonymization data; and dynamically retrieve from the multiple validator node distributed ledger and providing, at least one of (i) at least a subset of the set of anonymization data, and (ii) the one or more immutable machine learning models to the one or more trusted data sources, based on the request.

9. One or more non-transitory machine readable information storage media comprising one or more instructions that, when executed by one or more hardware processors, cause the one or more hardware processors to generate one or more immutable machine learning models for data analytics by:

receiving, via the one or more hardware processors, an input source data corresponding to at least one trusted data source amongst a plurality of trusted data sources;

storing the input source data in a multiple validator node distributed ledger to obtain a plurality of immutable records, wherein the multiple validator node distributed ledger is created for storing the input source data based on at least one of a consensus algorithm and a smart contract between the plurality of trusted data sources;

generating one or more machine learning models using the plurality of immutable records retrieved from the multiple validator node distributed ledger;

storing the one or more machine learning models as the one or more immutable machine learning models in the multiple validator node distributed ledger, wherein the one or more immutable machine learning models are generated based on the plurality of immutable records for one or more passive supervised machine learning techniques; and dynamically triggering, one or more actions specific to at least one Internet of Things (IoT) device deployed in an IoT platform using the one or more immutable machine learning models based on an input request received corresponding to the at least one Internet of Things (IoT) device.

10. The one or more non-transitory machine readable information storage media of claim 9, wherein the input request is received based on a triggered induced by at least one of a rule being executed or an event occurred in the IoT platform.

11. The one or more non-transitory machine readable information storage media of claim 9, wherein the one or more actions comprise activation or deactivation of one or more functionalities of the at least one IoT device based on at least one of a rule being executed or an event occurred in the IoT platform.

12. The one or more non-transitory machine readable information storage media of claim 9, wherein the instructions, when executed by the one or more hardware processors, further cause the one or more hardware processors to perform:

receiving a request from one or more trusted data sources;

anonymizing the plurality of immutable records to obtain a set of anonymization data; and dynamically retrieving from the multiple validator node distributed ledger and providing, at least one of (i) at least a subset of the set of anonymization data, and (ii) the one or more immutable machine learning models to the one or more trusted data sources, based on the request.

* * * * *